(12) United States Patent
Jang

(10) Patent No.: US 9,370,847 B2
(45) Date of Patent: Jun. 21, 2016

(54) METHOD FOR MANUFACTURING PISTON OF AUTOMOBILE ENGINE

(71) Applicants: Hyundai Motor Company, Seoul (KR); Kia Motors Corporation, Seoul (KR)

(72) Inventor: Pil Sung Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 14/094,531

(22) Filed: Dec. 2, 2013

(65) Prior Publication Data
US 2015/0000129 A1  Jan. 1, 2015

(30) Foreign Application Priority Data
Jun. 27, 2013  (KR) .................. 10-2013-0074956

(51) Int. Cl.
B23P 15/10 (2006.01)
B22D 19/04 (2006.01)
B22D 19/16 (2006.01)
F02F 3/00 (2006.01)

(52) U.S. Cl.
CPC .............. B23P 15/10 (2013.01); B22D 19/04 (2013.01); B22D 19/16 (2013.01); F02F 3/0015 (2013.01); *Y10T 29/49252* (2015.01)

(58) Field of Classification Search
CPC ........ B23P 15/10; F02F 3/0015; B22D 19/04; B22D 19/16; Y10T 29/49252
See application file for complete search history.

(56) References Cited

U.S. PATENT DOCUMENTS

| 5,913,960 A * | 6/1999 | Fletcher-Jones ................. 92/219 |
| 6,513,477 B1 * | 2/2003 | Gaiser et al. ................. 123/193.6 |
| 8,011,288 B2 * | 9/2011 | Gniesmer et al. ................. 92/231 |
| 2002/0166448 A1 * | 11/2002 | Bedwell ......................... 92/222 |
| 2010/0108017 A1 * | 5/2010 | Bing et al. ................. 123/193.6 |
| 2011/0119914 A1 | 5/2011 | Janssen et al. |

FOREIGN PATENT DOCUMENTS

| JP | 5-864 A | 1/1993 |
| JP | 10-99961 A | 4/1998 |
| KR | 10-2005-0073622 A | 7/2005 |
| KR | 10-2006-0109879 A | 10/2006 |
| WO | WO 2009/079988 A1 | 7/2009 |

* cited by examiner

*Primary Examiner* — Ryan J Walters
(74) *Attorney, Agent, or Firm* — Morgan, Lewis & Bockius LLP

(57) ABSTRACT

A method for manufacturing a piston can prevent casting defects such as oxide inclusions or shrinkage cavities on the surface of a combustion chamber over a piston head after casting. The method includes casting a head top having a bowl by pouring a first molten metallic material into a first mold with a bonding portion of the head top to be formed at an upper portion in the first mold and a first riser on the bonding portion of the head top, casting the body by pouring a second molten metallic material into a second mold, with a bonding portion of the body to be formed at an upper portion in the second mold and a second riser on the bonding portion of the body, removing the risers from the head top and the body, and integrally bonding the head top and the body to form the piston.

9 Claims, 5 Drawing Sheets

METHOD FOR MANUFACTURING PISTON OF AUTOMOBILE ENGINE

CROSS-REFERENCE TO RELATED APPLICATION

The present application claims priority of Korean Patent Application Number 10-2013-0074956 filed on Jun. 27, 2013, the entire contents of which application are incorporated herein for all purposes by this reference.

BACKGROUND OF INVENTION

1. Field of Invention

The present invention relates to a method for manufacturing a piston for an automobile engine, particularly a method for manufacturing a piston for an automobile engine which can prevent casting defects such as oxide inclusions or shrinkage cavities on the surface of a combustion chamber over a piston head after casting.

2. Description of Related Art

A piston in a vehicle engine is a part reciprocating within a cylinder to transmit power to a crankshaft through a connecting rod connected to its bottom while being pushed down by the force of a high-temperature and high-pressure gas in the power stroke.

The piston head is a portion of the combustion chamber and the combustion chamber is an element having large influence on performance and fuel efficiency in the engine, such that a structure that allows high-efficiency combustion of an air-fuel mixture with the minimum environmental pollution is required. The shape of the combustion chamber depends on the mounting position of the valve train and the ignition plug, the cooling type, and the shape of the piston head etc.

Recently, as an engine technology, a Gasoline Direct Injection (GDI) type of engine has been introduced to meet the increasing need for the development of a high-pressure injector technology and improve fuel efficiency. The GDI type has the advantage of improving engine performance and fuel efficiency and reducing exhaust gas, because it directly inject fuel into a combustion chamber and then burns it. In particular, the GDI type has the advantage of allowing ultra lean combustion with high combustion safety, as compared with a Port Fuel Injection (PFI) type (a type of supplying air-fuel mixture into a combustion chamber by injecting fuel into an intake port), which is an indirect injection type.

It is important in the GDI engines to collect well fuel, which is directly injected into the combustion chamber, around the ignition plug and this depends on the structure of the combustion chamber, accordingly the shape of the piston head that is a portion of the combustion chamber is also important.

A concave bowl that can control the flow of air and fuel is usually formed on the top of the piston (the head top) in the GDI engines in order to resolve the problem in mixing engine oil into the mixture, improve engine performance and fuel efficiency, and reduce Particular Matters (PMs) and exhaust gas. The bowl allows production of a dense mixture in the ignition area around the ignition plug by guiding the flow of the air and fuel.

That is, while the air introduced to the bowl through the intake port flows on the bowl wall, the flow is enhanced, and the fuel injected from an injector mixes with the air while vaporizing after hitting against the bowl wall, such that a stratified mixture is produced, and then combustion is made with the mixture rarefied throughout the combustion chamber, but stratified and dense around the ignition plug.

As described above, by forming the bowl to burn a dense mixture in the ignition area, it is possible to improve engine performance and fuel efficiency and to reduce particular matters and exhaust gas. Further, the shape of the top of the piston head with a bowl, which is a portion of the combustion chamber, influences engine oil dilution, engine performance and fuel efficiency, and production of particular matters and exhaust gas.

Accordingly, various shapes of bowls for maximizing combustion performance and fuel efficiency and minimizing exhaust gas have been proposed, and Korean Patent Application Publication Nos. 10-2004-0041308 and 10-2009-0064171 and Korean Patent No. 10-0946484 can be exemplified as prior art documents for a piston with a bowl. Further, as a method of manufacturing a piston head, gravity die casting is widely used, and Korean Patent Application Publication No. 10-2002-0024678 and Korean Patent No. 10-1009962 can be exemplified as prior art documents for a manufacturing method using gravity die casting.

In general, the gravity die casting means a casting method of making a casting by injecting molten metal into a mold, using gravity, and is widely used for manufacturing pistons, sleeves, crankcases, cylinders, and bearings etc., using non-ferrous metal alloys such as aluminum (Al), magnesium (Mg), and copper (Cu), cast iron, and steel.

In the process of manufacturing a piston, using the gravity die casting, molten metal is poured into a mold by a ladle and molded/hardened for a predetermined time, and then the molded product is cooled by opening the mold. After the product is cooled, the riser formed in casting is removed by turning or milling and a bowl is formed, and then following machining for a skirt, a ring groove, a pin hole, and an oil hole is performed, thereby completing a piston head.

Recently, as the shape of the top of a piston head, including a bowl and a combustion chamber, is complicated for the combustion characteristic, it becomes difficult to remove a riser and form a bowl. In particular, casting defects such as oxide inclusions and shrinkage cavities and a problem in durability is generated with the complication of the shape and additional machining for removing the defected portions is required.

FIGS. 1 and 2 are views illustrating problems in the related art. FIG. 1 shows the flow path of molten metal poured inside through a gate of a mold in manufacturing a piston, and FIG. 2 is a view illustrating that an oxidized film is formed in a combustion chamber by a change in flow of molten metal due to the concave shape of a bowl on head top.

In a piston that is used for a GDI engine, a concave bowl (12 in FIG. 2) is supposed to be formed, as described above, on the top 11 of the piston head, and as shown in FIG. 1, a riser 13 is positioned inside the bowl in casting.

As molten metal is poured inside through a gate 2, the molten metal rises up from the bottom in a mold 1 and, in the normal case, an oxidized film that is formed on the surface of the molten metal is supposed to be moved and collected at a riser 13 on the top of the piston and then the oxidized film is supposed to be removed with the riser 13 without remaining on the piston head.

However, since the shape of the top 11 of the piston head is complicated by a bowl, the flow of the molten metal changes in direction at the curved portion such as the bowl (the flow of the molten metal is changed by the concave shape of the bowl) and a large amount of oxidized film is produced on the top of the head (on the surface of the combustion chamber).

As shown in FIG. 2, the oxidized film on the surface is blocked and not moved to the riser 13 by the curved portion and remains as an oxide inclusion on the surface of the bowl 12 on the top 11 of the head (the surface of the combustion chamber). Further, the molten metal does not smoothly flows on the surface of the bowl 12, such that many casting defects such as shrinkage cavities are generated.

FIG. 3 is a picture showing that oxide inclusions remain on the concave curved portion of a bowl on a piston manufactured by a manufacturing method of the related art and FIG. 4 is a picture showing shrinkage cavities and oxide inclusions on the surface of a combustion chamber after gravity die casting.

Since the shapes of bowls on pistons are recently complicated to improve a combustion characteristic, the possibility of a casting defect generated on the surface of the head top (the surface of a combustion chamber) is further increased. Since the casting defects are the basic reasons for damage of pistons, it is required to preclude casting defects on the surface of the combustion chamber or remove casting defects through additional machining after casting, in order to improve durability of the pistons.

The additional machining causes a problem that limits the shape of the bowl, for example, a circular bowl for turning (machining the inside of the bowl), in addition to reduction of productivity, and requires milling for other shapes than a circle. In particular, the more complicated the shape is, the more difficult the machining is and even 3D NC machining is required to remove casting defects by machining the complicated surface of the top of a piston head, and therefore, productivity may be considerably decreased (milling for the top of a bowl and 3D NC machining for the outside of a bowl).

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method for manufacturing a piston for an automobile engine which can prevent casting defects such as oxide inclusions or shrinkage cavities on the surface of a combustion chamber over a piston head after casting.

Various aspects of the present invention provide for a method for manufacturing a piston of an automobile engine, which includes: casting a head top having a bowl by pouring a first molten metallic material into a first mold, with a bonding portion of the head top to be formed at an upper portion in the first mold and a first riser on the bonding portion of the head top; casting the body, which is a part of the piston excluding the head top, by pouring a second molten metallic material into a second mold, with a bonding portion of the body to be formed at an upper portion in the second mold and a second riser on the bonding portion of the body; removing the risers from the head top and the body; and integrally bonding the head top and the body at the bonding portions of the head top and the body, thereby forming the piston.

In one aspect, the method may further include machining at least one of the bonding portions of the head top and the body to form a flat bonding side on the at least one of the bonding portions, wherein the machining is performed after the riser or risers are removed. The removing of risers and the machining of at least one of the bonding portions may be performed by turning.

In various aspects, the head top and the body are bonded by brazing or friction bonding. In some aspects, the head top and the body are made of an aluminum alloy. In other aspects, a top ring groove is integrally formed on the head top. The head top is made of a cast iron and the body is made of an aluminum alloy.

Therefore, according to the method for manufacturing a piston of the present invention, since the body and the head top are separately casted and then bonded in the present invention, it is possible to manufacture a piston without a material defect due to an oxide film or other issues. In particular, it is possible to effectively prevent casting defects, even if the shape of the bowl is complicated for optimizing the combustion chamber and a high-level additional process for removing the portion with a casting defect is removed, and therefore, it is possible to ensure productivity and reduce the process cost and the manufacturing cost.

Further, since it is possible to simultaneously perform the solution heat treatment for improving the strength of the piston and brazing for bonding the body and the heat top in one integrated process, separate solution heat treatment can be removed and the entire process can be simplified. Further, since the top ring groove 15 is integrally formed on the head top 11 made of cast iron by casting to be able to perform the function of a cast iron insert (ring carrier), separate insert casting is not necessary; therefore, the process for manufacturing a piston can be reduced and simplified and an oxide film defect on the top of the combustion chamber due to the cast iron insert can be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a method for manufacturing a piston for an automobile engine which can prevent casting defects such as oxide inclusions or shrinkage cavities on the surface of a combustion chamber over a piston head after casting.

A method of manufacturing an integrated piston by separately casting the head top with a bowl and a body, the other part exclusive of the head top, and then by bonding them is exemplified herein. The head top includes the top of a piston that defines a combustion chamber and the body includes a skirt and the portion to which a connecting rod is connected under the head top.

Figure 1:
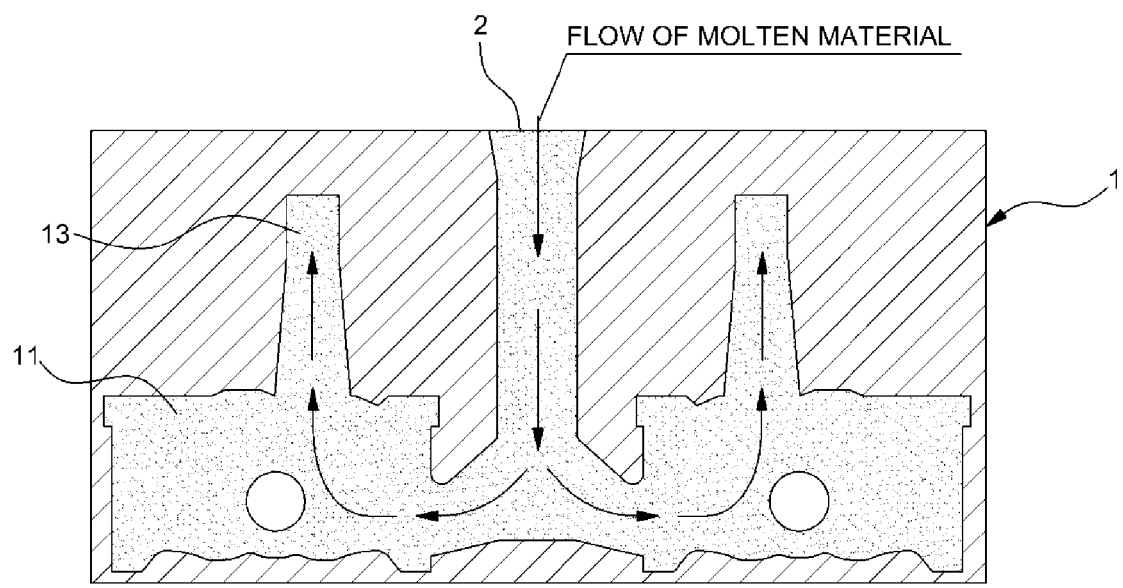
FIG. 1 is a cross-sectional view showing the flow of molten metal in a mold in manufacturing a piston in accordance with a manufacturing method of the related art.
Figure 2:
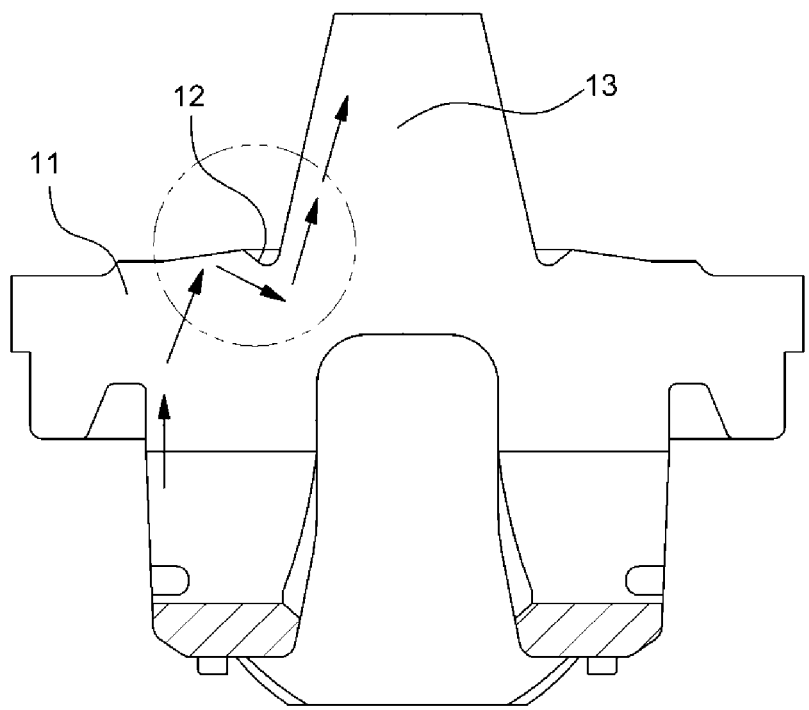
FIG. 2 is a view illustrating that an oxidized film is formed in a combustion chamber by a change in flow of molten metal due to the concave shape of a bowl on head top in a manufacturing method of the related art.
Figure 3:
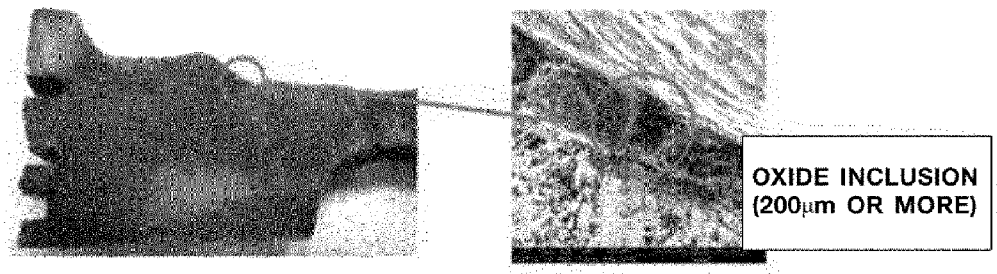
FIG. 3 is a picture showing that oxide inclusions remain on the concave curved portion of a bowl on a piston manufactured by a manufacturing method of the related art.
Figure 4:
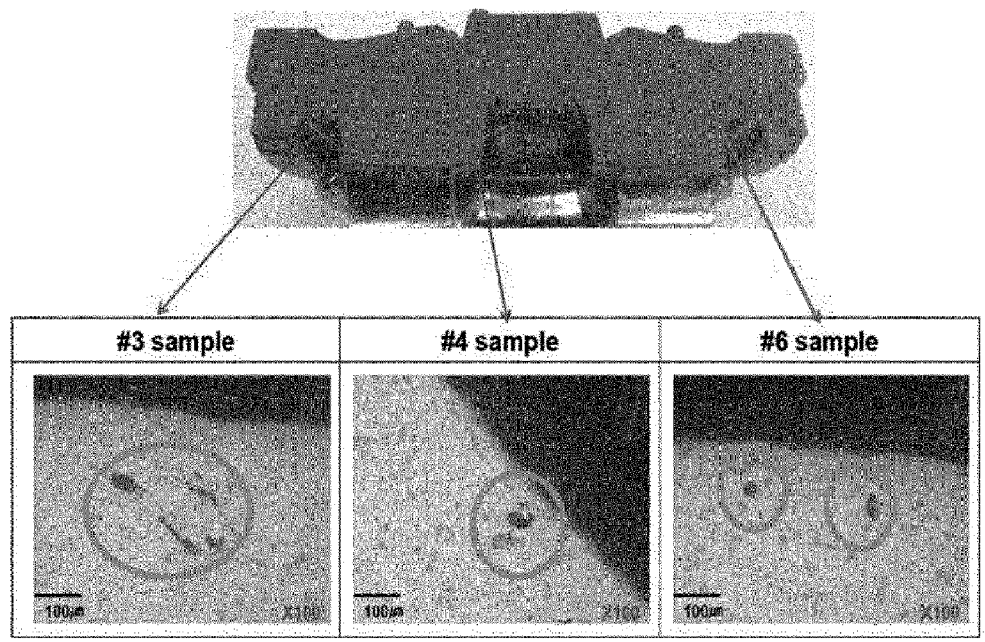
FIG. 4 is a picture showing shrinkage cavities and oxide inclusions on the surface of a combustion chamber after gravity die casting.
Figure 5:
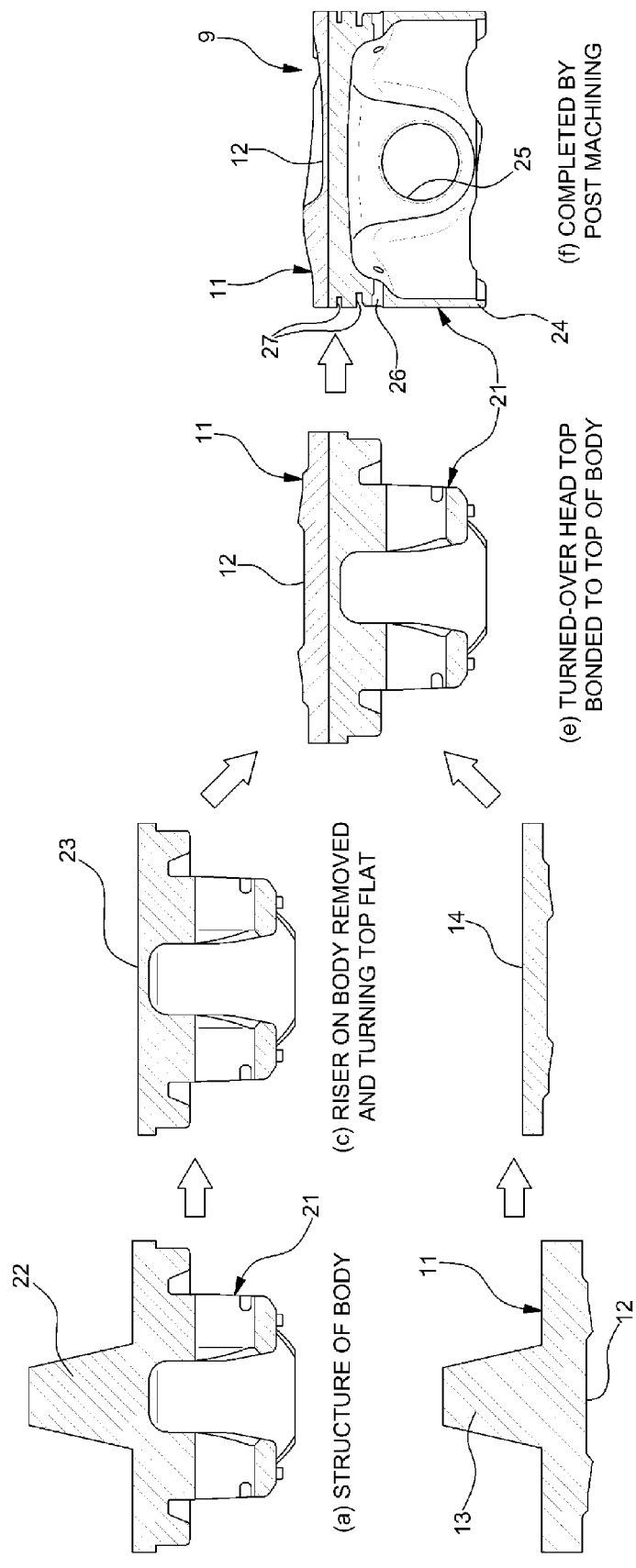
FIG. 5 is a process status view illustrating a first exemplary method for manufacturing a piston according to the present invention.

FIG. 5 is a process status view illustrating a method for manufacturing a piston according to a first exemplary embodiment of the present invention and shows a process of manufacturing an integrated piston by separately casting a body and the head top and then bonding them.

In the manufacturing process of the present invention, a body 21 is formed with the top 23 flat by casting and turning such that a riser 22 is positioned above the body in a mold in gravity die casting and an oxide film is collected as much as possible to the riser 22 at the upper portion in casting. Obviously, a mold for manufacturing separately the body 21 is needed and a mold that can form the riser 22 on the body 21 is used, such that molten metal or metallic material rises up in the mold while being poured inside through a gate and the oxide film produced on the molten metal or metallic material is moved and collected to the riser 22 above the main body 21 (see FIG. 5(a)).

After the body 21 is casted, the riser 22 can be easily removed, for example, by turning and the top 23 of the body (the surface being in contact with the head top) is machined flat, such that the machining is easy. It is possible to completely remove casting defects and defects of the oxide inclusions by removing only the riser 22 (see FIG. 5(c)). The body 21 that has undergone casting is shaped with a skirt 24 and a pin hole 25 where a connection rod is connected.

The top head 11 is formed with the bonding side (bottom) 14, which is to be bonded to the body 21, flatten by casting and turning, and is turned over and cast in a mold and a mold for casting the head top 11 or a mold that can cast a head top turned over is used.

Accordingly, the surface where a concave bowl 12 (the top of the head top) is positioned in gravity die casing is formed at a lower portion in the mold, whereas the bottom of the head top 11 to be machine flat is formed at an upper portion in the mold, such that the riser 13 is positioned above the portion to be machined flat.

Accordingly, an oxide film does not remain on the surface (which is the top with the bowl) positioned at the lower portion in the mold in casting and an oxide film is collected as much as possible only in the riser 13 above the portion to be machined flat (that is, the portion positioned at the upper portion in the mold, which is machined flat and bonded to the body).

After the head top 11 is casted, the riser 13 can be easily removed by turning and the surface 14 on which the riser 13 has been is machined flat, such that the machining is easy. Further, it is possible to completely remove casting defects and defects of the oxide inclusions by removing only the riser 13.

An integrated piston 9 is formed by bonding the body 21 with the risers 13 and 22 removed and the head top 11, in which the head top 11 is turned over opposite to the casting and bonded to the body 21. That is, the top 23 of the body machined flat (on which the riser has been) and the bottom 14 of the head top machined flat (on which the riser has been) are bonded, thereby forming an integrated piston.

The body 21 and the head top 11, which are separated casted, may be bonded, for example, by brazing or friction bonding. The body 21 and the head top 11 are made of an aluminum alloy by separate casting and then the bonding side (top) 23 of the body machined flat and the bonding side (bottom) of the head top 11 are bonded by brazing or friction bonding.

Common brazing, a kind of welding, is performed at a temperature of 450° C. or more or at the temperature of a melting point or less, using gas resistance, induced heating, or infrared rays, and provides high bonding strength and an excellent external appearance, without deformation or damage of the base material or residual stress.

The body 21 and the head top 11 are also heated to at least 450° C. or more for brazing in the present invention, in which when the temperature is set to the solution temperature of the material (generally set to the recrystallization temperature or more and the melting point temperature of less), for example, at 500° C. and brazing is performed, the solution heat treatment for improving the strength of the piston material can be performed through an integrated process in the bonding process and separate solution heat treatment can be removed, such that the entire process is reduced.

After the body 21 and the head top 11 are bonded, as described above, the shape of the bowl 12 is completed by post machining and then the piston 9 is completed by forming a ring groove 27 or an oil hole 26.

Therefore, since the body and the head top are separately cast and then bonded in the present invention, it is possible to manufacture a piston without a material defect due to an oxide film. In particular, it is possible to effectively prevent casting defects, even if the shape of the bowl is complicated for optimizing the combustion chamber and a high-level additional process for removing the portion with a casting defect is removed, and therefore, it is possible to ensure productivity and reduce the process cost and the manufacturing cost.

Further, since it is possible to simultaneously perform the solution heat treatment for improving the strength of the piston and brazing for bonding the body and the heat top in one integrated process, separate solution heat treatment can be removed and the entire process can be simplified.

Figure 6:
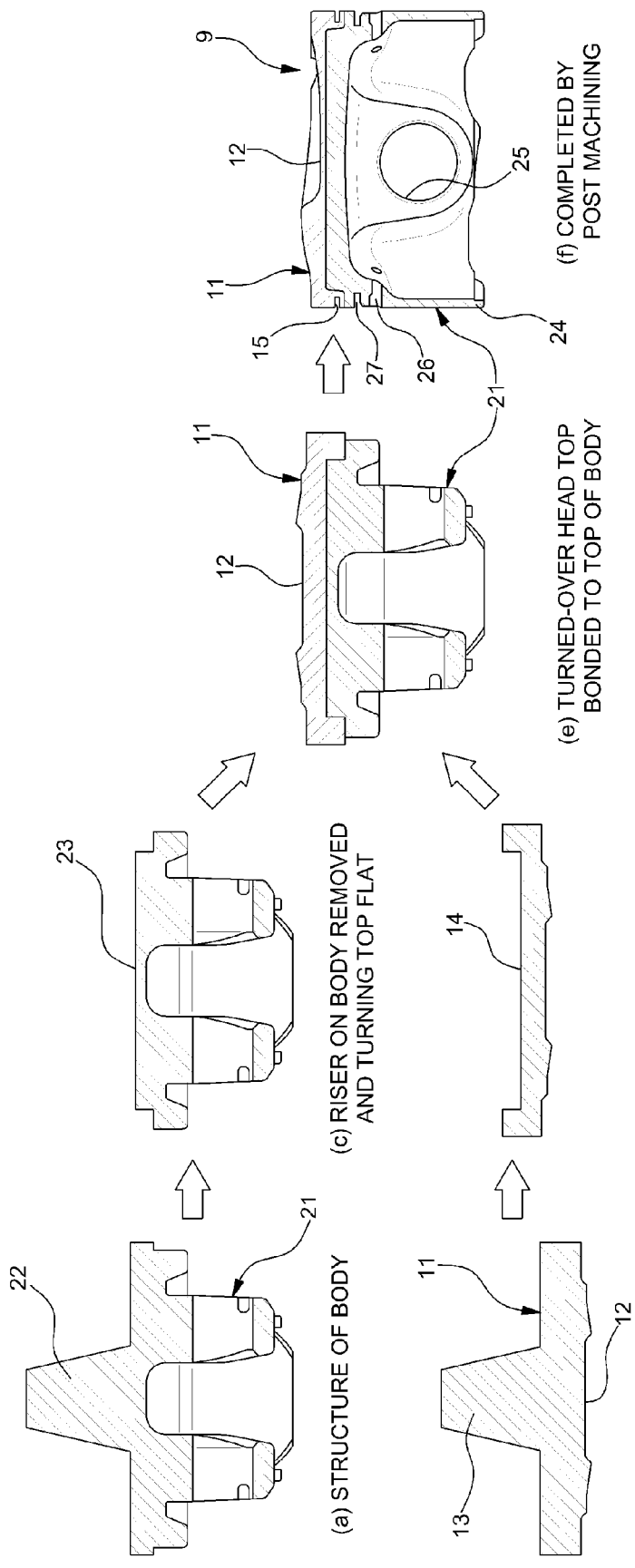
FIG. 6 is a process status view illustrating a second exemplary method for manufacturing a piston according to the present invention and FIG. 7 is a cross-sectional view showing a piston equipped with a cast iron insert.

FIG. 6 is a process status view illustrating a method for manufacturing a piston according to a second exemplary embodiment of the present invention and the second exemplary embodiment is similar to or substantially the same as the first exemplary embodiment in manufacturing the integrated piston 9 by separately casting the body 21 and the head top 11 and then bonding them.

Different than the first embodiment, the head top 11 in the second embodiment has a shape with a top ring groove 15, in which the body 21 may be made of an aluminum alloy by casting and the head top 11 may be made of cast iron.

In a high power engine, a tip ring groove requires high abrasion resistance to prevent abrasion of the top ring groove due to vertical vibration of a top ring. Accordingly, when an aluminum alloy piston is casted, insert casting that separately casts a top ring groove (cast iron insert or ring carrier) of cast iron and then placing it into a mold is used.

Figure 7:
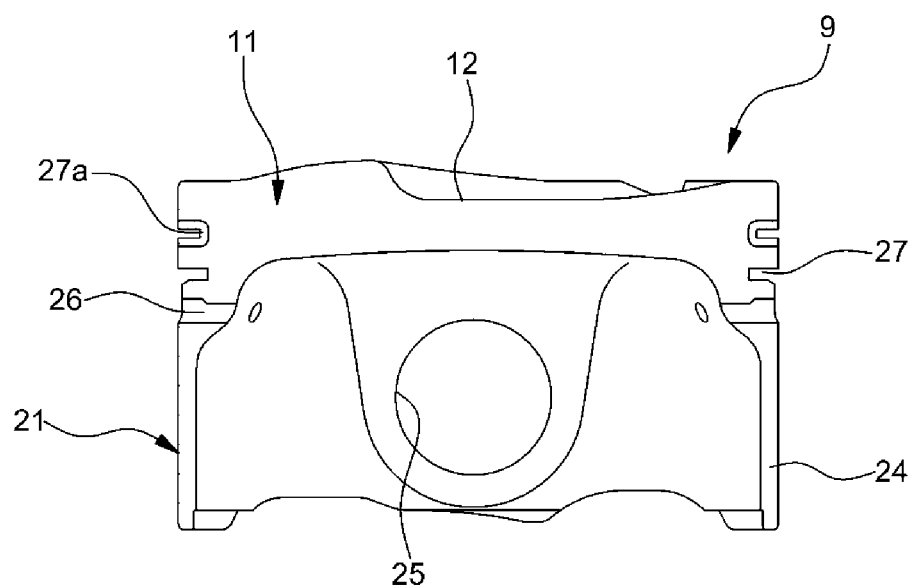

FIG. 7 is a cross-sectional view showing a piston equipped with a cast iron insert, in which a cast iron insert 27a separately made of cast iron is in a top ring groove. However, as the cast iron insert 27a is used, an oxide film is produced on the contact surface of the insert when molten metal or metallic material (aluminum alloy-molten metal), which is poured into a mold, comes in contact with the cast iron insert fixed in the mold, and accordingly, more oxide film on the combustion chamber surface of the head top 11 is produced.

Therefore, in the second exemplary embodiment, the top ring groove 15 is integrally formed on the head top 11 made of cast iron by casting to be able to perform the function of a cast iron insert (ring carrier). One will appreciate that such integral components may be monolithically formed. In this case, since separate insert casting is not necessary, the process for manufacturing a piston can be reduced and simplified and an oxide film defect on the top of the combustion chamber due to the cast iron insert can be prevented.

For convenience in explanation and accurate definition in the appended claims, the terms "top" or "bottom", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing a piston of an automobile engine, the method comprising:
    casting a head top having a bowl by pouring a first molten metallic material into a first mold, with a bonding portion of the head top to be formed at an upper portion in the first mold and a first riser on the bonding portion of the head top;
    casting a body, which is a part of the piston excluding the head top, by pouring a second molten metallic material into a second mold, with a bonding portion of the body to be formed at an upper portion in the second mold and a second riser on the bonding portion of the body;
    removing the risers from the head top and the body; and
    integrally bonding the head top and the body at the bonding portions of the head top and the body, thereby forming the piston,
    wherein a top ring groove is integrally formed on the head top.

2. The method of claim 1, further comprising:
    machining at least one of the bonding portions of the head top and the body to form a flat bonding side on the at least one of the bonding portions, wherein the machining is performed after the riser or risers are removed.

3. The method of claim 2, wherein the removing of risers and the machining of at least one of the bonding portions are performed by turning.

4. The method of claim 1, wherein the head top and the body are bonded by brazing or friction bonding.

5. The method of claim 1, wherein the head top and the body are made of an aluminum alloy.

6. The method of 1, wherein the head top is made of a cast iron and the body is made of an aluminum alloy.

7. The method of claim 6, wherein the top ring groove is monolithically formed with the head top, and the top ring groove is configured to function as a ring carrier.

8. The method of claim 6, wherein the head top includes a lip that extends toward the body to surround a top portion of the body, and the top ring groove is integrally formed in the lip of the head top.

9. The method of claim 1, wherein the body has a ring groove formed in the body and the ring groove is substantially parallel to the top ring groove.

* * * * *